(12) United States Patent
Borrowman et al.

(10) Patent No.: US 10,104,152 B2
(45) Date of Patent: Oct. 16, 2018

(54) INTER-APPLICATION COMMUNICATION AND INTEGRATION BROKER

(71) Applicant: TeamMate Licensing B.V., Alphen aan den Rijn (NL)

(72) Inventors: Colin D. Borrowman, Tampa, FL (US); Byron Saunders, Tampa, FL (US); Carl Nelson Artz, Odessa, FL (US); Richard Myott, Tampa, FL (US); Steven Calise, Spring Hill, FL (US); John C. Gagnon, Tampa, FL (US)

(73) Assignee: TEAMMATE LICENSING B.V., Alphen aan den Rijn (NL)

( * ) Notice: Subject to any disclaimer, the term of this patent is extended or adjusted under 35 U.S.C. 154(b) by 135 days.

(21) Appl. No.: 15/141,125

(22) Filed: Apr. 28, 2016

(65) Prior Publication Data

US 2017/0318072 A1 Nov. 2, 2017

(51) Int. Cl.
*G06F 15/16* (2006.01)
*H04L 29/08* (2006.01)
(Continued)

(52) U.S. Cl.
CPC .............. *H04L 67/02* (2013.01); *G06F 9/543* (2013.01); *G06F 9/546* (2013.01); *H04L 67/42* (2013.01)

(58) Field of Classification Search
CPC ......... G06F 9/543; G06F 9/546; H04L 67/02; H04L 67/42
See application file for complete search history.

(56) References Cited

U.S. PATENT DOCUMENTS 5,893,079 A 4/1999 Cwenar
6,065,026 A 5/2000 Cornelia et al.
(Continued)

FOREIGN PATENT DOCUMENTS

WO WO-2015/047439 A1 4/2015

OTHER PUBLICATIONS

"IBM Integration Bus" Wikipedia entry, retrieved from the Internet at: <https://en.wikipedia.org/w/index.php?title=IBM_Integration_Bus&oldid=701852492> (Jan. 26, 2016).
(Continued)

*Primary Examiner* — June Y Sison
*Assistant Examiner* — Dixon F Dabipi
(74) *Attorney, Agent, or Firm* — Marshall, Gerstein & Borun LLP

(57) ABSTRACT

A system for intermediated communication between applications running on the same computer is presented. The system routes communication between a first application and a second application through a data broker on a remote server to avoid direct communication between the applications. The first application may be a desktop application, such as a word processing application, that has an add-in installed to facilitate communication through the data broker. The second application may be a web browser that includes a web client implemented using standard functionality of the web browser, without an application-specific plug-in. The data broker operates on a remote server to receive and direct communication between the applications. By eliminating direct communication between the applications, the data broker improves system security and reliability by utilizing communication protocols and capabilities already existing within the computer.

19 Claims, 7 Drawing Sheets

(51) Int. Cl.
    *H04L 29/06*     (2006.01)
    *G06F 9/54*     (2006.01)

(56) References Cited

U.S. PATENT DOCUMENTS

| | | | |
|---|---|---|---|
| 7,073,133 B2* | 7/2006 | Hughes | G06F 17/3064 |
| | | | 707/E17.066 |
| 7,644,088 B2 | 1/2010 | Fawcett et al. | |
| 7,941,444 B2* | 5/2011 | Cragun | G06F 17/30873 |
| | | | 707/784 |
| 8,301,718 B2* | 10/2012 | Macken | G06F 9/542 |
| | | | 709/201 |
| 8,826,448 B2 | 9/2014 | Peckover | |
| 8,984,582 B2 | 3/2015 | Ruppin et al. | |
| 9,009,582 B2 | 4/2015 | Rochelle et al. | |
| 9,098,483 B2* | 8/2015 | Le Brazidec | G06F 17/246 |
| 2002/0063735 A1 | 5/2002 | Tamir et al. | |
| 2003/0036966 A1 | 2/2003 | Amra et al. | |
| 2005/0262515 A1* | 11/2005 | Dinh | G06F 9/546 |
| | | | 719/314 |
| 2009/0276667 A1* | 11/2009 | Dopson | G06F 9/5027 |
| | | | 714/48 |
| 2012/0036125 A1 | 2/2012 | Al-Kofahi et al. | |
| 2015/0205847 A1 | 7/2015 | Gloski et al. | |
| 2015/0312177 A1* | 10/2015 | Ben-Ezra | H04L 51/043 |
| | | | 709/206 |

OTHER PUBLICATIONS

International Search Report and Written Opinion, International Application No. PCT/IB2017/000523, dated Jul. 17, 2017.

* cited by examiner

INTER-APPLICATION COMMUNICATION AND INTEGRATION BROKER

TECHNICAL FIELD

The present disclosure generally relates to systems and methods for intermediated communication between software applications.

BACKGROUND

Various software programs and platforms exist to allow users to interact with documents and other files. These include word processing applications, document viewing applications, spreadsheet applications, and others. In some situations, a user may need to review documents and copy information between different programs, which may be achieved by simple copy and paste commands under many conditions. In some situations, however, it is desirable to generate a link connecting data across multiple applications. As an example, a user may wish to provide a link to a portion of a document cited in a report in connection with copied text from the document. To establish and track such inter-application links, custom add-ins are generally installed into each of the relevant software applications. The custom add-ins facilitate direct communication between the applications operating on the same computer. Because of security concerns, such custom add-ins must typically be installed by authorized personnel having administrative access to each computer on which they are to be installed. Additionally, such add-ins inherently create new security vulnerabilities by creating new entry points for attack by malicious software or unauthorized users. These security vulnerabilities generally become worse with time unless additional security updates or patches are installed, requiring further involvement of authorized personnel.

SUMMARY

As described further herein, the disclosure generally relates to systems, methods, and non-transitory computer-readable media storing instructions for enabling communication between applications on a computing device through a data broker on a remote server through a network. In various embodiments, systems including a server and a computing device are described. Each of the server and computing device include one or more processors and one or more memories to store program and other data, which may include one or more databases. Each of the server and computing device may further include a communication module enabling electronic communication through a computer network. To facilitate electronic communication between a first application and a second application operating on the same computing device, the server may implement a data broker by executing instructions stored in the one or more memories of the server using the one or more processors of the server.

The data broker may receive user-indicated data from an application add-in component of a first application executing on the client computing device via the communication module of the server and cause the server to send a message including information relating to the received data to a web client application implemented by a second application executing on the same client computing device via the communication module in response to the received data. The message may cause the web client application to display the information relating to the received data to a user of the client computing device. Additionally, the application add-in component of the first application and the web client application of the second application may be adapted to communicate with each other only through the data broker. In particularly preferred embodiments, the web client application may be implemented by the web browser without a plug-in specific to the web client application. In further embodiments, the data broker may be configured to communicate with the second application using any of a plurality of the real-time communication types, which may include: WebSocket, server-sent events, forever frame, or long polling. The data broker may be further configured to communicate with the second application by selecting one of the plurality of real-time communication types.

The data broker may further be configured to receive user-input data entered by the user from the web client of the second application via the communication module and send a second message including information associated with the user-input data to the application add-in component of the first application. In some embodiments, the user-indicated data may be associated with a portion of a document accessed via the first application, and the user-input data may include a comment associated with the portion of the document, in which case the second message may include information linking the portion of the document to the comment. The data broker may be further configured to store information regarding the comment in an entry in the database, and the information linking the portion of the document to the comment may include a link to the entry in the database. In further embodiments, the message including information relating to the received data may include instructions to cause the web client to present a window to the user, which window may be configured to accept the comment from the user. The second message may further cause the add-in component of the first application to add an indication of the link to the document accessed via the first application. Such link may be navigated by a user of the first application to obtain additional information, which may include the comment.

The computing device may receive an indication of a portion of a document accessed using a first application from a user of the first application at an add-in component of the first application. The add-in component of the first application may then cause the computing device to generate a first message including information associated with the portion of the document and transmit the first message to a data broker of a server from the add-in component of the first application via a communication network. The computing device may receive a second message corresponding to the first message from the data broker of the server at a web client of the second application and display information to the user by the web client of the second application based upon the second message. The indication of the portion of the document may include a selection within the first application of data in the portion of the document. In such case, the first and second messages may include representations of the selected data (which may include an exact copy of the selected data), and the information displayed to the user by the web client of the second application may include the representation of the selected data included in the second message.

The application add-in component of the first application and the web client application of the second application may be adapted to communicate only through the data broker. Additionally, the web client application may be implemented by the second application without a plug-in specific to the web client application. In some embodiments, the second application may be a web browser, and the first application may be one of the following: a word processing application, a spreadsheet application, a presentation application, another document viewing application, or an image viewing application. The add-in component may be installed as an addition to the first application utilizing an application programming interface (API) of the first application.

In some embodiments, the computing device may further receive user-input data entered by the user at the web client application. The user-input data may include a comment associated with the portion of the document. In response to receiving the user-input data, the computing device may generate a third message including information associated with the user-input data by the web client application and transmit the third message to the data broker of the server from the web client application. The computing device may then receive a fourth message corresponding to the third message from the data broker at the application add-in component of the first application. The fourth message may include a link to information regarding the comment. In response to receipt of the fourth message, the computing device may further add an indication of the link to the portion of the document by the add-in component of the first application.

In yet further embodiments, communication may be facilitated by computer-implemented methods, including the following: establishing a first communication connection over a communication network between an add-on component of a first application executing on a client computer and a data broker executing on a server; establishing a second communication connection over the communication network between the data broker executing on the server and a web client of a second application executing on the client computer; sending to the data broker, from one of (i) the add-on component via the first communication connection or (ii) the web client via the second communication connection, a message including information relating to a user input indicating a comment regarding a portion of a document accessed via the first application; receiving from the data broker, at the other one of (i) the web client via the second communication connection or (ii) the add-on component via the first communication connection, the message; and recording a link between the portion of the document and the comment. The application add-in component of the first application and the web client application of the second application may be configured to communicate only through the data broker. Additionally, the second application may be a web browser, and the web client application may be implemented by the web browser without a plug-in specific to the web client application.

This summary is necessarily limited to certain key aspects of the invention described herein. Additional or alternative components, aspects, functions, or actions may be included in various embodiments, as described further below.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 3 illustrates a sequence diagram of communication between a web client and a desktop application add-in.

DETAILED DESCRIPTION

The following description of the invention disclosed herein describes various embodiments of intermediated communication systems and methods. The systems and methods facilitate communication between two or more applications on a computing device through a data broker on a remote server. Thus, the applications communicate via a computer network with the data broker, but the applications do not directly communicate with each other. This has numerous advantages in relation to network administration and security. Because the applications do not directly communicate, they may utilize standard communication protocols and routines already installed on the computing device. This reduces set-up and maintenance time, particularly where end users of the computing device do not have administrative permissions required to install programs. Additionally, using existing communication channels limits exposure to security threats by avoiding the creation of new target points within the system that may be attacked. Moreover, the use of widely used communication protocols further enhances security by avoiding the need to create custom security patches to address each new security threat.

Exemplary Inter-Application Communication System

Figure 1:
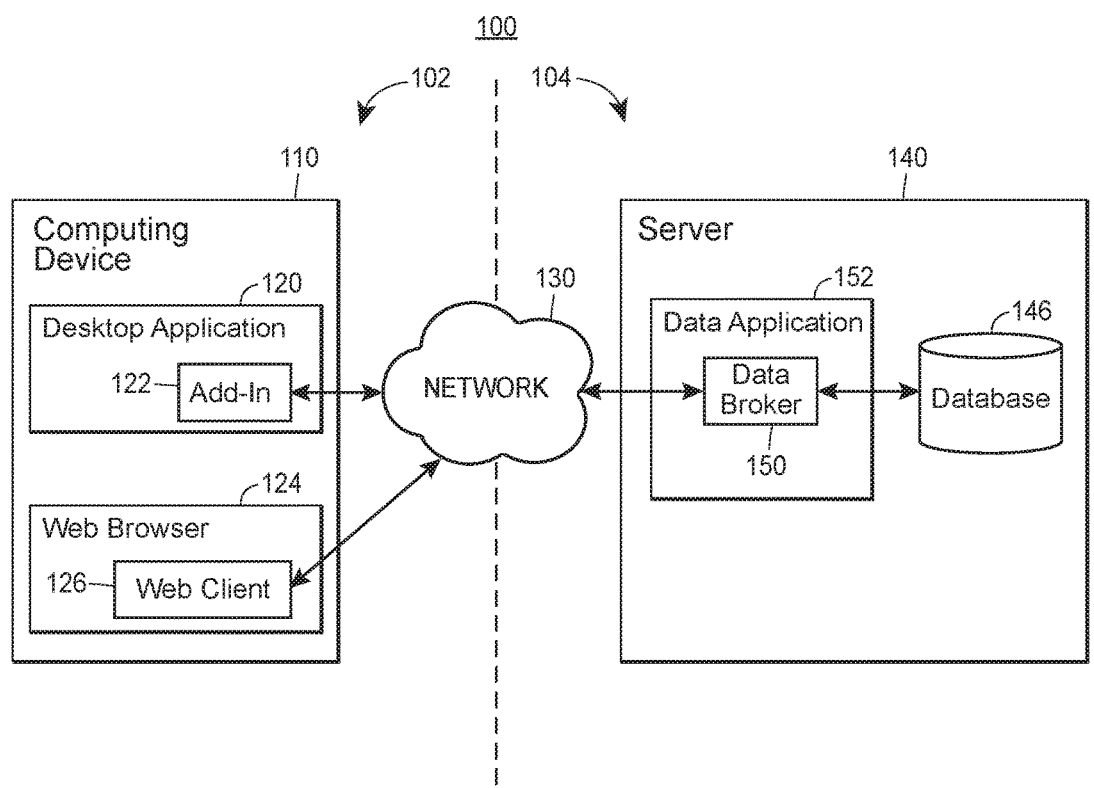
FIG. 1 illustrates a block diagram of an exemplary inter-application communication system in accordance with the described embodiments.

FIG. 1 illustrates a block diagram of an exemplary inter-application communication system 100, showing certain key features of the system for facilitating intermediated communication between applications running on a computing device. The exemplary system 100 includes front-end components 102 disposed within a computing device 110 and back-end components 104 disposed within a server 140. The computing device 110 and the server 140 are communicatively connected to send and receive data via a network 130. The computing device 110 executes a plurality of software applications, which communicate in real-time (i.e., without a significant delay beyond ordinary delays caused by data processing and transmission) only through a data broker 150 running on the server 140. Thus, communication between a first application and a second application must first be sent through the network 130 to the sever 140, then back through the network 130 from the sever 140. Additional information regarding components of the system 100 is discussed below with reference to FIG. 7.

As illustrated in the exemplary embodiment of the system 100, the computing device 110 may implement two or more software applications, programs, or routines. Although these may include various types of software, the exemplary embodiment illustrates a preferred embodiment having a desktop application 120 and a web browser 124. The desktop application 120 may be any type of program or application running on the computing device 110, such as a word processing program, a spreadsheet program, a document presentation program, a document viewing program, or an image viewing program. If the computing device 110 is a mobile device using a mobile operating system (e.g., Apple Inc.'s iOS® or Google Inc.'s Android® operating systems), the desktop application 120 may be a mobile app operating on the mobile device.

The desktop application 120 may include an add-in component 122 that adds additional functionality to the desktop application 120. The additional functionality may include accessing external data sources, performing data processing within the desktop application 120, creating data connections to or from data within the desktop application 120, interacting with a remote data application 152 on the server 140, or other functions not included in the desktop application 120 without the add-in component 122. The add-in component 122 includes some function involving communicating data to or from the desktop application 120 to another application or program. This communication function may include communicating (indirectly) with another application running on the computing device 110, such as the web browser 124. This communication function may further include communicating with an application running on the server 140, such as the data application 152. Regardless of the communication function, the add-in component 122 communicates data with another application or program only through a data broker 150 of the server 140.

Unlike the web client 124 discussed below, the add-in component 122 may need to be installed as an addition to the desktop application 120 on the computing device 110 prior to use. The add-in component 122 may be configured to interface with the desktop application 120 via an application program interface (API) of the desktop application 120 that permits direct access to some data and operations within the desktop application 120. Use of such APIs permits fuller integration of the add-in component 122 within the desktop application 120. Because the installation may require additions or adjustments to the desktop application 120 or other programs of the computing device 110 (such as the operating system), installation of the add-in component 122 may require security or administrative privileges. Thus, the add-in component 122 (and any updates, upgrades, or patches thereto) may be installed on the client device 110 by an authorized network administrator or computer technician, rather than by an end user. Although such installation may require additional setup time and coordination of multiple system users, the advantages of direct integration of the add-in component 122 to the desktop application 120 and the relative infrequency of such installation may justify such additional effort.

In the exemplary embodiment of the system 100, a web browser 124 is further implemented on the computing device 110. The web browser 124 may be a separate program or application installed and running on the computing device 110, including general-purpose web browser programs or special-purpose applications capable of interpreting and presenting content utilizing standard World Wide Web protocols and formats. In various embodiments, the web browser 124 may be integrated into an operating system of the computing device 110 or may be a separate program or application running on the computing device 110. Although described herein as a web browser to illustrate more clearly the configuration and operation of the systems and methods, the web browser 124 could be any similar general-purpose or special-purpose application or program that provides for user data input and output together with data communication over a computer communication network. For example, a special-purpose client application running on the computing device 110 may be configured to interface with the data application 152 running on the server 140 to access the server-based data application 152, which may store and process data received from a plurality of users or other data sources.

The web browser 124 may further implement a web client 126 that communicates with the server 140 via the network 130. The web client 126 may be implemented as a routine or sub-routine of the web browser 124 that is specifically initiated by the web browser 124 to communicate with the data broker 150 or that generally operates when the web browser 124 operates. The web client 126 may open or occupy all or part of a window of the web browser 126 to present information to or receive information from a user of the computing device 110. In some embodiments, the web client 126 may operate within the web browser 124 as a specific instance of a functionality of the web browser 124. In further embodiments, the web client 126 may be implemented using a general-purpose plug-in or addition to the web browser 124, such as a JavaScript plug-in. The web client 126 may be a web page or web form, a script run by the web browser 124 or a plug-in, or a similar software component operating within the web browser 124.

It is important to note, however, that the web client 126 is implemented by the web server 124 without a plug-in or other installed addition to the web server 124 that is specific to the web client 126. Instead, the web client 126 operates using the basic functionality of the web browser 124 or a commonly installed plug-in that has a wide range of other uses beyond communication with the data broker 150 as described herein. By utilizing preexisting capabilities of the web browser 124 (including, in some embodiments, capabilities of widely used plug-ins already installed on the computing device 110), the system 100 avoids the security and permissions issues involved in installing custom plug-ins, add-ins, or programs. As described above, installation of programs, add-ins, or plug-ins may require security or administrative permissions, which permissions may be limited to administrators or technicians. By using programs already installed on the computing device 110, the web client 126 facilitates communication with the data broker 150 and, therethrough, with the add-in component 122 without requiring installation of custom software programs, applications, routines, add-ins, or plug-ins related to the web browser 124. This reduces the security risk and the maintenance time required by the system.

Both the add-in component 122 and the web client 126 communicate with the server 140 via the network 130. Although one server 140 is shown, one or more servers 140 may be used for facilitate communication between the add-in component 122 and the web client 126. The server 140 implements a data broker 150 to send and receive data over the network 130. The data broker 150 both sends and receives data between the server 140 and each of the add-in component 122 and the web client 126. In some embodiments, the data broker 150 may additionally communicate with a database 146 stored on or communicatively connected to the server 140 to record or access data. In some embodiments, the data broker 150 may be part of a data application 152, or the data broker 150 may be configured to communicate with such data application 152. Other embodiments may omit the data application 152, while maintaining the data broker 150 as a key aspect of the invention. Such data application 150 may be a software application or platform that receives, stores, processes, and/or presents data for any of a variety of purposes, such as described elsewhere herein. In some embodiments, the data application 152 may handle database access and operations based upon messages received at the data broker 150. For example, the data application 152 may facilitate copying or linking portions of a document opened in the desktop application 120 for storage in the database 146 and presentation or revision in the web browser 124.

The data broker 150 facilitates communication between the add-in component 122 and the web client 126 by receiving messages transmitted from one of these components (i.e., the add-in component 122 or the web client 126) via the network 130 and transmitting corresponding messages to the other component (i.e., the web client 126 or the add-in component 122) via the network 130. For example, the data broker 150 may receive a message sent by the add-in 122 and send a corresponding message to the web client 126. The corresponding message sent by the data broker 150 may be generated based upon the receive message, or the corresponding message may simply be a retransmission of a copy of the received message to the other component. The messages may include data selected or entered by a user of the computing device 110, as well as commands causing certain actions to be taken by the add-in component 122, the web client 126, or the data application 152. The add-in component 122 and the web client 126 communicate with each other only through the data broker 150, despite implementing on the same computing device 110. In some embodiments, the add-in component 122 or the web client 126 may communicate with other applications or data sources of the server 140 or other remote servers (not shown) through the network 130. In other embodiments, the add-in component 122 and/or the web client 126 may only communicate with any other application or data source through the data broker 150.

To enable communication between the add-in component 122 and the web client 126, the data broker 150 may be implemented as an application running on the server 140 using one or more real-time communication protocols. As noted above, the data broker 150 may similarly be a routine or process of a data application 152 running on the server 140. The data broker 150 preferably utilizes an event-based framework to provide real-time control and communication between the add-in component 122 and the web client 126 by pushing messages to the computing device 110 in response to receiving a message indicating a triggering event. In some embodiments, the data broker 150 may be configured to use multiple communication types, such as WebSocket, server-sent events, forever frame, long polling, or others. If so configured, the data broker 150 may then select a communication type to use for communication between the add-in component 122 and the web client 126. Such selection may be made during setup or configuration of the data broker 150, or the data broker 150 may include instructions to select an appropriate communication type automatically based upon the add-in component 122 and/or the web client 126 (e.g., version, operating system, communication types supported, etc.). In a preferred embodiments, the data broker 150 can be implemented as an application using the SignalR library of ASP.NET to handle real-time communication between the add-in component 122 and the web client 126 using remote procedure calls. This implementation has the advantage of establishing persistent connections between the server 140 and the add-in component 122 and the web client 126, and it automatically uses the WebSocket transport when available.

Exemplary Communication Methods

The following examples further illustrate the operation of the exemplary inter-application communication system 100, discussed above. FIGS. 2-5 illustrate sequence diagrams of communication between the add-in component 122 and the web client 126 through the data broker 150. In each of these figures, the add-in component 122 and web client 126 are shown as operating on the computing device 110 and communicating through the network 130 with the data broker 150 operating on the server 140. Although the illustrated operation sequences are only examples of some of the many communications that may be handled by the data broker 150 using the system 100, the illustrated sequences further clarify the indirect communication between the components on the computing device 110 through the server 140.

Figure 2:
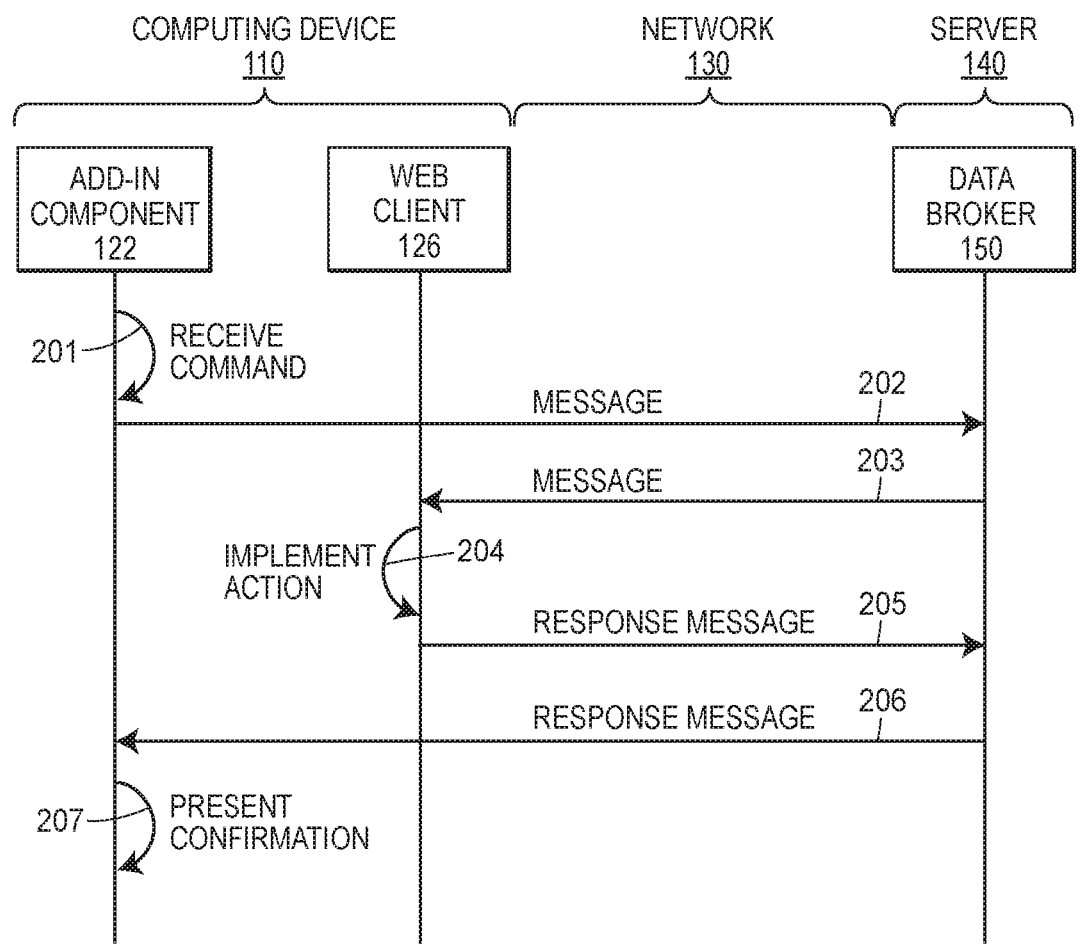
FIG. 2 illustrates a sequence diagram of communication between a desktop application add-in and a web client.

FIG. 2 illustrates an example of communication originating at the add-in component 122 of the desktop application 120 that indicates a message causing an action by the web client 126 of the web browser 124. Such message may be a command to take an action (e.g., opening a new window, updating displayed data, generating a link to a document or portion thereof, etc.) or may provide information to facilitate a later action (e.g., providing an indication that copied data is available to be pasted, which may cause a paste button to be presented or become active). The exemplary communication process may begin by receiving a user command at the add-in component 122 indicating data to communicate to the web client 126 (line 201). The user may expressly issue a command to take some action, such as adding a link or copying selected text into a window in the web browser 124. Alternatively, the command may be inferred from user action or application conditions, such as a user selecting a copying a portion of a document within the desktop application 120. The add-in component 122 may generate a message including data indicated (explicitly or implicitly) by the user in respond to receiving the command. In some embodiments, such user-indicated data may include an indication of a portion of a document open in the desktop application 120, such as a user-selected portion of text to be copied to the web client 126 or a user-indicated anchor point within the document to be associated with a user comment. The add-in component 122 then sends the message including the user-indicated data to the data broker 150 at the server 140 through the network 130 (line 202).

The data broker 150 receives the message sent from the add-in component 122 (line 202). In some embodiments, the data broker 150 may perform data processing or data storage operations on the server 140 in response to receiving the message. For example, the data broker 150 may extract the user-indicated data from the message and create a new entry in the database 146 using the user-indicated data (or data derived therefrom or metadata added thereto). As another example, the data broker 150 may extract the user-indicated data from the received message and generate a second message including the user-indicated data (or information related thereto) using a format for communicating with the web client 126. In other embodiments, the data broker 150 may simply identify the received message as directed to the web client 126 and redirect the received message without modification. In either case, the data broker 150 sends a message including information relating to the user-indicated data to the web client 126 at the computing device 110 through the network 130 (line 203).

The web client 126 receives the message sent from the data broker 150 (line 203). The web client 126 may process the information included in the message and implement one or more actions within the web browser 124 (line 204). Such actions may include opening a new window or presenting one or more new options or fields within a window. In some embodiments, the web client 126 may display a window of the web browser 124 configured to accept user comments in response to the information contained in the message. For example, the message may include an indication of a portion of a document open in the desktop application 120, and the web client 126 may present a text box for entry of user comments associated with the portion of the document. The user may thus be presented with a window displaying the portion of the document (e.g., a copy of text selected by the user in the desktop application 120) and one or more options to assess and/or comment on the displayed portion. In some embodiments, the window may present selectable options to allow the user to categorize or evaluate the portion of the document using defined or standardized descriptors. In other embodiments, the web client 126 may take actions not visible to the user, such as storing data included in the message or acknowledging receipt of the message. For example, the web client 126 may verify the message received includes information or instructions that are readable by the web client 126 (i.e., in a known format and not obviously corrupted). The web client 126 may then generate and send a response message to the data broker 150 at the server 140 through the network 130 (line 205). The response message may simply acknowledge receipt of the message or may include new information, such as user-input data (e.g., user comments and/or selections).

The data broker 150 receives the response message from the web client 126 (line 205). In some embodiments, the data broker 150 may perform data processing or data storage operations on the server 140 in response to receiving the response message. For example, the data broker 150 may extract and store a user-input comment or other data included in the response message in the database 146. In some embodiments, the data broker 150 may further create or update a link between user-input data from the web client 126 and a portion of a document accessed by the desktop application 120, as described elsewhere herein. The data broker 150 may generate a new response message for the add-in component 122 or a copy of the received response message for further transmission to the add-in component 122. The response message may include an acknowledgement of receipt of the message sent by the add-in component 122 from the web client 126. The response message may further include additional information related to user input at the web client 126, metadata from the web client 126 or the data broker 150, or data generated at the server 140 by the data broker 150 or the data application 152. For example, the response message may include an acknowledgement of receipt, a user-input comment from the web client 126, and a reference to a link between the user comment and a portion of a document open in the desktop application 120 generated by the data application 152 and stored in the database 146. The data broker 150 then sends the response message associated with the response message received from the web client 126 through the network 130 to the add-in component 122 at the computing device 110 (line 206).

The add-in component 122 receives the response message from the data broker 150 (line 206). In some embodiments, the add-in component 122 may note or present a confirmation of implementation of the initial command upon receipt of response message (line 207). In further embodiments, the add-in component 122 may implement additional actions based upon the information included in the response message. Such additional actions may include bringing the desktop application 120 into focus on a display, presenting additional information to the user, presenting a window or dialogue box to prompt the user for additional input or selections, or other actions. If the response message includes an indication of a link to user-input or user-selected data, the add-in component 122 may generate and/or insert a link indicator into a document accessed through the desktop application 120. For example, the add-in component 122 may generate and insert a hypertext link at an anchor location within a portion of the document that links to user comments stored in the database 146 regarding the portion of the document. Other actions may be performed by the add-in component 122 based upon the content of the response message in various other embodiments.

Figure 3:
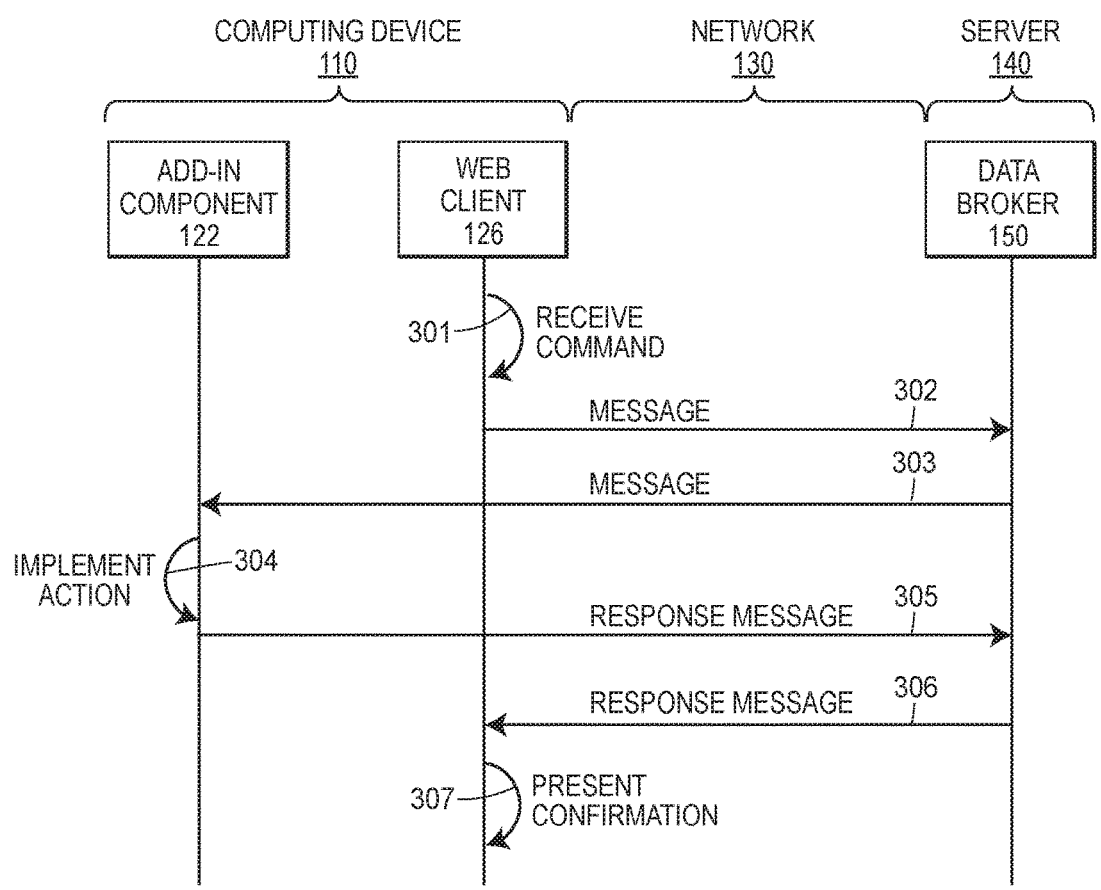

FIG. 3 illustrates a similar example of communication originating at the web client 126 of the web browser 124 that indicates a message causing an action by the add-in component 122 of the desktop application 120. The communication illustrated in FIG. 3 may be performed together with the communication illustrated in FIG. 2 in some instances. As an example, the communication described above (FIG. 2) may operate to send an indication of a user-selected portion of a document (e.g., a selection of text or a cell within a spreadsheet) from the desktop application 120 to the web browser 124 for user review and comments, and the communication described below (FIG. 3) may further operate to send information associated with user-input comments from the web browser 124 back to the desktop application 120. In some embodiments, the desktop application 120 may add an indication of the user comments to the document. Such indication may include the comments or may include a link to the user comments, which may be stored in the database 146 at the server 140. In other instances, the communication illustrated in FIG. 3 may be performed separately from the communication illustrated in FIG. 2. For example, a user may review comments regarding documents using the web browser 124 implementing the web client 126 and may take an action to open a document (or view a portion of a document) associated with the comment in the desktop application 120 by communication from the web client 126 through the data broker 150.

As above, the communication may begin in response to receipt at the web client 126 of a command (line 301), which may be a selection or input from a user or may be automatically generated based upon predetermined conditions. In response to the command, the web client 126 may generate and send a message to the data broker 150 through the network 130 (line 302). The message may include an indication of user-selected or user-input data received from the user by the web client 126 at the web browser 124, such as comments or assessment of one or more documents. Additionally, or alternatively, the message may include an indication of a document or a portion of a document, either directly or by reference to data stored in the database 146 that further identifies the document. Regardless of content, the message is sent by the web client 126 from the computing device 110 to the data broker 150 at the server 140 through the network 130.

Upon receiving the message (line 302), the data broker 150 may process the received message. In some embodiments, the data broker 150 may store data extracted or derived from the message in the database 146, including user-input comments, metadata regarding the message, or other data. The data broker 150 may create or update an entry in the database 146 based upon the message in some instances. The data broker 150 may retransmit a copy of the received message or may generate a new message based upon the received message. The newly generated message may include an indication of a link to an entry in the database 146, which may contain information associated with the user input (e.g., comments, ratings, assessments, metadata such as timestamps or user identity, etc.). The data broker 150 then sends the copy of the message or the newly generated message from the server 140 to the add-in component 122 at the computing device 110 through the network 130 (line 303).

The add-in component 122 receives the message from the data broker 150 (line 303) and implements one or more actions based upon the message (line 304). The actions may be as simple as generating a response message confirming receipt, or the actions may include performing one or more functions within the desktop application 120. In some embodiments, the message may include information indicating a user comment to be linked to the document. The add-in component 122 may operate within the desktop application 120 to add a link or other indicator within the document to provide a connection between the document and the user-input data. For example, the add-in component 122 may insert a link in a portion of the document that identifies an entry within the database 146 storing a user comment associated with the portion of the document. User comments may also be directly added to the document, such as by adding a footnote or a margin comment, as well as by other known techniques of document annotation. Actions may further include bringing the desktop application 120 into focus on a display, navigating within a document to present a requested portion of the document, copying a portion of the document, adding or removing a link, adding or removing a comment, or revising a portion of the document by inserting or deleting document content. In some embodiments, the add-in component 122 may then send a response message back from the computing device 110 to the data broker 150 at the server 140 through the network 130 (line 305). The response message may include data requested by the web client 126, information for creating or updating a link, a confirmation of receipt of the message, or other relevant information.

Upon receiving the response message (line 305), the data broker 150 may process the received response message. In some embodiments, the data broker 150 may store data contained within or derived from indications within the response message in the database 146. In some embodiments, the data broker 150 may similarly cause the data application 152 to perform actions at the server 140, such as updating information regarding the document or determining another document to update. The data broker 150 may generate a new response message based upon the received response message, or the data broker 150 may retransmit a copy of the received response message. In either case, the data broker 150 sends the (newly generated or original) response message from the server 140 to the web client 126 at the computing device 110 through the network 130 (line 306).

Upon receiving the response message (line 306), the web client 126 may present a confirmation or take some other action at the computing device 110 (block 307). Other actions may include inserting or presenting data from a document returned through the response message, presenting additional options for selection, presenting a user comment, presenting a link to the document or additional data, or any other action using information returned as part of the response message. In some embodiments, the confirmation may be presented by proceeding to a new screen, updating the screen, or not displaying an error alert. In further embodiments, the web client 126 may not present a confirmation or take any other action upon receipt of the response message.

Figure 4:
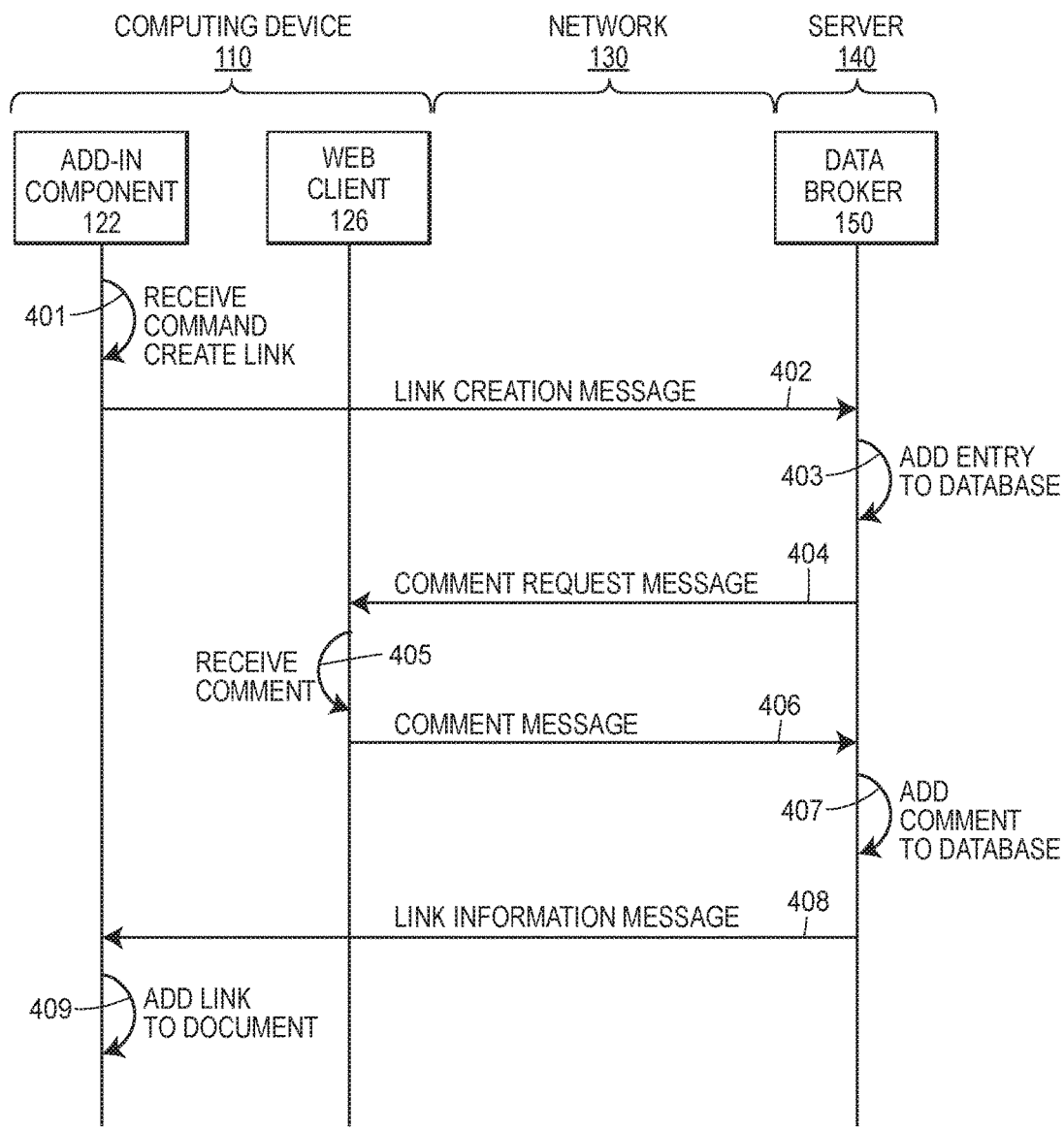
FIG. 4 illustrates a sequence diagram of an exemplary link generation process in accordance with the described embodiments.
Figure 5:
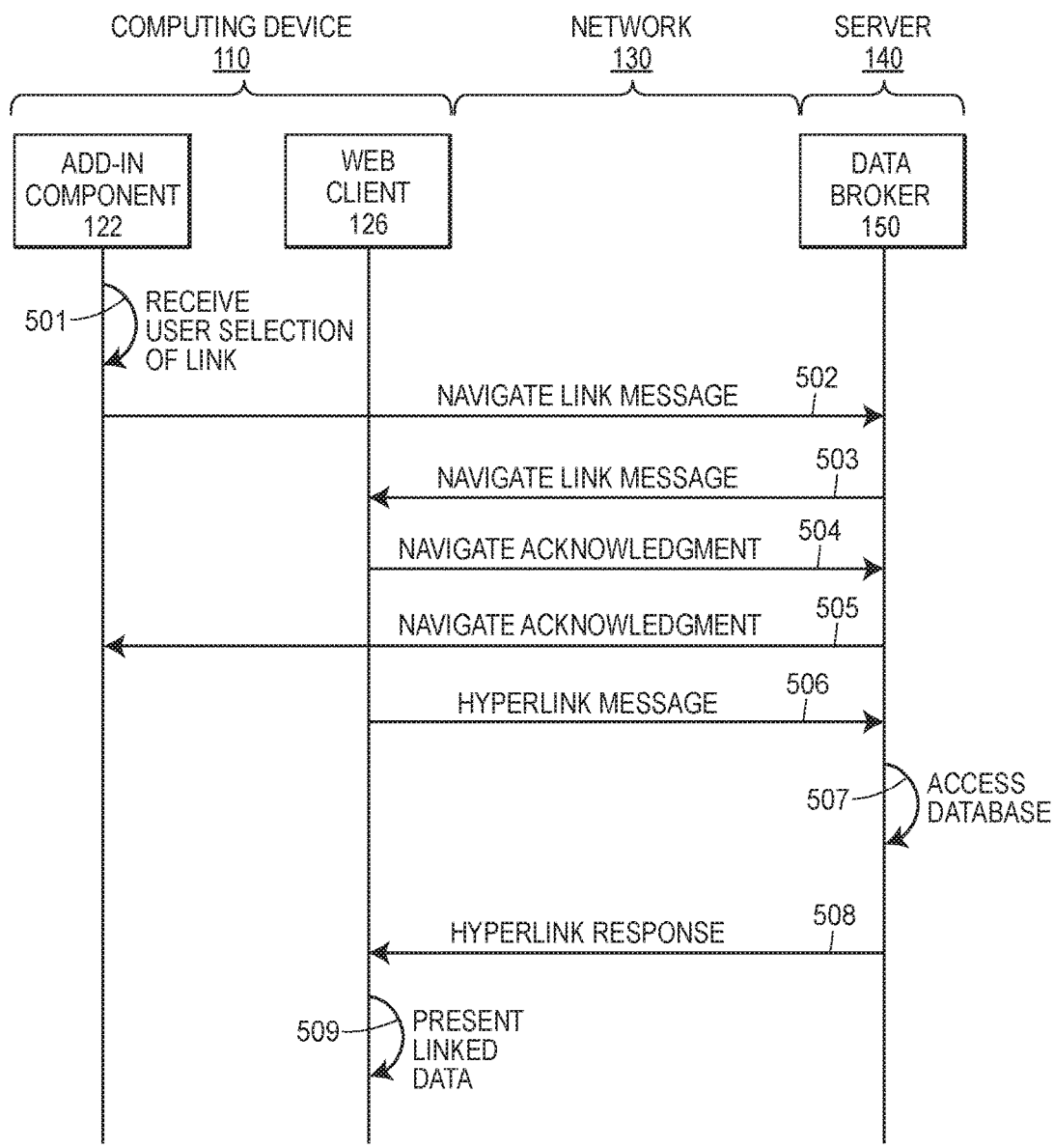
FIG. 5 illustrates a sequence diagram of an exemplary link navigation process in accordance with the described embodiments.

Further examples of communication between the desktop application 120 and the web browser 124 through the data broker 150 are illustrated in FIGS. 4 and 5. Specifically, the communications illustrated therein relate to creating and navigating embedded links associated with user comments regarding portion of documents. Although a particular example is illustrated and discussed, other similar techniques may be used in some embodiments, in accordance with the disclosure elsewhere herein. Such alternative embodiments may include creating, editing, deleting, or navigating links starting with either of the desktop application 120 and the web browser 124. As with all embodiments described herein, the add-in component 122 of the desktop application and the web client 126 of the web browser 124 communicate with each other only through the data broker 150.

FIG. 4 illustrates an exemplary communication method for creating a link in a document accessed using the desktop application 120 to information stored on the server 140 in the database 146 that includes a comment entered by the user via the web browser 124. The method begins with receipt by the add-in component 122 of the desktop application 120 of a user command to create a new link (line 401). The command may specify a portion of a document accessed by the desktop application 120, such as a location, page, cell, column, row, sheet, or selected content within the document. The add-in component 122 generates a link creation message indicating the link command and sends the link creation message to the data broker 150 via the network 150 (line 402). The message may further include an indication of the portion of the document, such as a copy of document content or an anchor point within the document that will be associated with the link.

The data broker 150 receives the link creation message at the server 140 (line 402) and processes its content. Based upon the link creation message, the data broker 150 adds an entry to the database 146 for the link (line 403). In other embodiments, the entry may be added at a later time when the comment or other information is received from the user via the web client 126. The data broker 150 may, in some embodiments, interface with the database 146 through the data application 152. In such embodiments, the data application 152 may access and perform operations within the database 146 based upon data received from the data broker 150. The data broker 150 or data application 152 may then generate a comment request message based upon the received link creation message, which may specify certain information requested from the user to be associated with the link. The data broker 150 then sends the comment request message from the server 140 to the web client 126 at the computing device 110 through the network 130 (line 404).

The web client 126 receives the comment request message from the data broker 150 (line 404). In response, the web client 126 may operate within the web browser 124 to display information regarding the link to the user. The information presented to the user via the web browser 124 includes an indication of the link and a request or option to enter a comment. The information may also include a copy of content from the document in some embodiments, such as content selected by the user in the desktop application 120. The web client 126 may then wait until a comment or other input is entered by the user. Upon receiving the comment from the user (line 405), the web client 126 generates a comment message including the comment and an indication of any other input from the user. The web client 126 then sends the comment message to the data broker 150 at the server 140 through the network 130 (line 406).

The data broker 150 receives the comment message from the web client 126 (line 406). In response, the data broker 150 or data application 152 may add the received information to the database 146 (line 407). This may include adding the comment to an existing entry or creating a new entry to store the comment. The entry may include an identifier associated with the link, which identifier may be further associated with other information, such as a group of documents or a reviewer. The comment may further be associated with metadata regarding the comment, such as the date and time the comment was created or the user who created the comment. The data broker 150 then generates a link information message for the add-in component 122. The link information message may include information regarding the link, such as an identifier associated with the link in the database 146. In some embodiments, the information regarding the link may include a universal resource locator (URL) or other address to be used as the link in the document. The link information message may further include information regarding the link, such as metadata or display parameters. The link information message is then sent by data broker 150 from the server 140 to the add-in component 122 at the computing device 110 through the network 130 (line 408).

The add-in component 122 receives the link information message from the data broker 150 (line 408). In response, the add-in component 122 may add the link to the document in the desktop application 120 or take other actions to create the link (line 409). This may include generating a link or comment at an anchor location or associated with a portion of the document. The link, link indicator, or comment may be added in-line or overlaid on the document. For example, the link may be presented as a link indicator that may present the user comment or other information when selected by the user. In some embodiments, the add-in component 122 may handle link and comment presentation to the user, while such presentation may be handled by the desktop application 120 in other embodiments.

FIG. 5 illustrates an exemplary communication method for navigating a link in a document opened by the desktop application 120 to present information to the user at the web browser 124. Such communication methods may be used, for example, to present a previously entered comment to the same or different user for review or revision via the web browser 124. The method begins by receiving at the add-in component 122 an indication of a user selection of a link in a document (line 501). The indication may be generated by a user clicking on a link or link indicator within the document opened in the desktop application 120. In response to receiving the indication of user selection of the link, the add-in component 122 generates a navigate link message. The navigate link message may include information identifying the link or the link target, such as a URL or an identifier of an entry in the database 146. In some embodiments, information regarding the user may be included in the message, such as user identity. Such user information may be used to verify user authorization to view or edit the link or to look up user presentation preferences for displaying the linked information. The add-in component 122 then sends the navigate link message from the computer device 110 to the data broker 150 at the server 140 through the network 130 (line 502).

The data broker 150 receives the navigate link message from the add-in component 122 (line 502). In response, the data broker 150 may extract the information identifying the linked data and any other information included in the navigate link message. The data broker 150 may, in some embodiments, verify user permissions and preferences relating to the linked data. In some embodiments, the data broker 150 or the data application 152 may verify the link identifies data that is available in the database 146 (i.e., may check that the link is not outdated or broken). The data broker 150 may then generate a new navigate link message for the web client 126 based upon the information in the received navigate link message. The data broker 150 then sends the navigate link message from the server 140 to the web client 126 at the computing device 110 (line 503).

The web client 126 receives the navigate link message from the data broker 150 (line 503). In response, the web client 126 may take multiple actions within the web browser 124. The web client 126 may first send a navigate acknowledgment message back to the data broker (line 504). This navigate acknowledgement message may acknowledge receipt of the navigate link message. In some embodiments, the web client 126 may verify that it is able to perform the functions indicated in the navigate link message (i.e., that the web client 126 recognizes the instructions in the navigate link message and has sufficient system permissions to execute the instructions).

Upon receiving a navigate acknowledgement message back from the web client 126 (line 504), the data broker 150 may generate and send a navigate acknowledgement message back from the server 140 to the add-in component 122 at the computing device 110 through the network 130 (line 505). Upon receipt of such navigate acknowledgement message, the add-in component 122 may consider the link navigation request complete and end the task. If no such navigate acknowledgement message is received by the add-in component 122 within a timeout period, the add-in component 122 may instead consider the attempted communication failed. In response to such failure determination, the add-in component 122 may attempt to resend the navigate link message to the data broker 150 (line 502), or the add-in component 122 may present an error alert.

After the web client 126 sends the navigate acknowledgement message to the data broker 150 (line 504), the web client 126 may further generate a hyperlink message to obtain the linked information from the server 140 or another source via communication through the network 130. The hyperlink message may include a data request using HTML, XML, JavaScript, or other standard Internet communication protocols, or the hyperlink message may include a data request using an application-specific format. In any event, the hyperlink message requests data associated with the link stored at a remote server based upon information included in the navigation message received from the data broker 150. The web client 126 causes the web browser 124 to send the hyperlink message to the server 140 through the network 130, which may include sending the message from the web client 126 to the data broker 150 at the server 140 (line 506). In some embodiments, the hyperlink message may instead be directly sent to a web server of the server 140, thereby avoiding the data broker 150. In further embodiments, the web client 126 may cause the web browser 124 to send additional hyperlink messages to further remote servers to obtain information. In the illustrated embodiment, however, the hyperlink message is sent by the web client 126 from the computing device 110 to the data broker 150 of the server 140 through the network 130.

The data broker 150 (or other application running on the server 140) receives the hyperlink message from the web client 126 or by other operation of the web browser 124 (line 506). Upon receiving the hyperlink message, the data broker 150 may access the database 146 to retrieve the requested information related to the selected link (line 507). The data broker 150 may cause the data application 152 (or another routine thereof) to access the database 146 to retrieve the requested information, such as a previously stored user comment. If the hyperlink message is received at the server 140 by a web server application, rather than the data broker 150, the web server application may instead access the database 146, or the web server application may cause the data application 152 to access the database 146 to retrieve the requested information. Upon obtaining the information from the database 146, the data broker 150 (or web server) may generate a hyperlink response message including the requested information and send the hyperlink response message from the server 140 to the web client 126 (or web browser 124) at the computing device 110 through the network (line 508).

Upon receiving the hyperlink response message from the server 140 through the network 130 (line 508), the web client 126 may cause the web browser 124 to present the received information associated with the link to the user. This may include opening a new window of the web browser 124 to present the information or presenting the information within a portion of an open window. In some embodiments, this may include presenting one or more options to revise, edit, approve, disapprove, or delete information related to the link, such as a previously entered user comment. Additional or alternative functionality may be included in various other embodiments.

Figure 6:
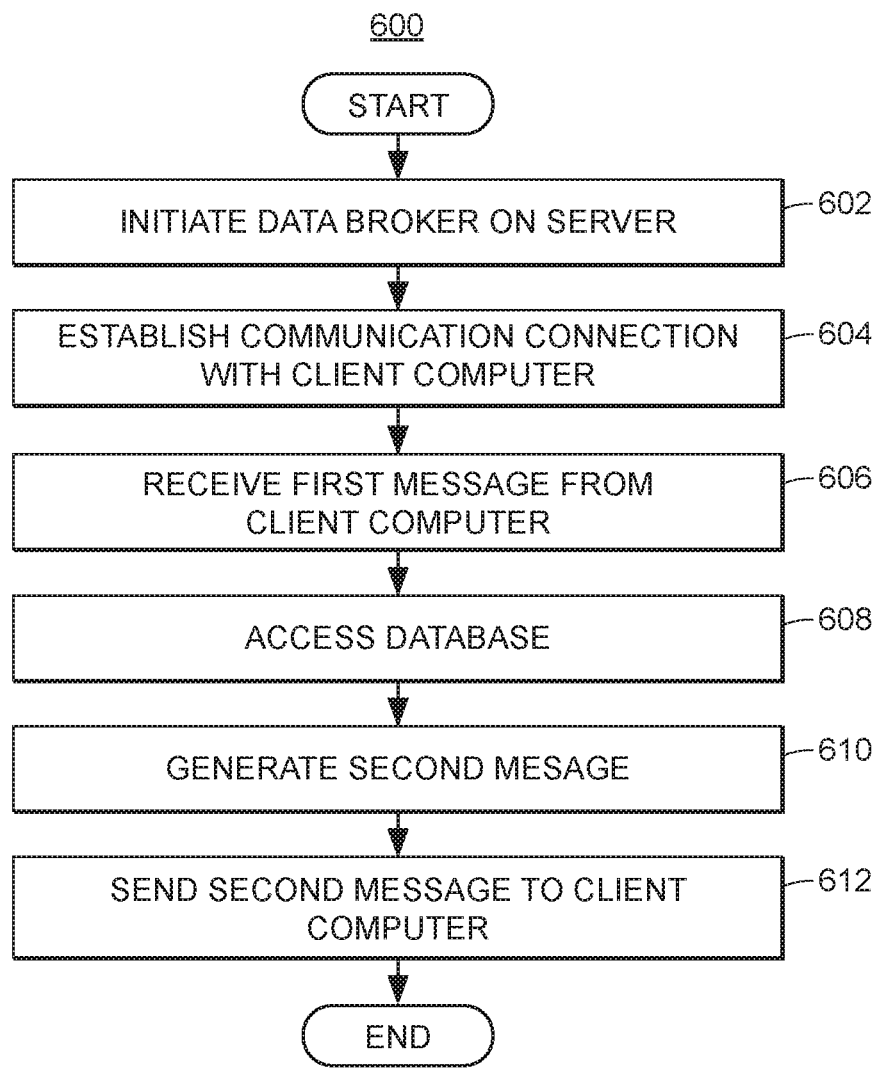
FIG. 6 illustrates a flow diagram of an exemplary communication brokering method in accordance with the described embodiments.

FIG. 6 illustrates a flow diagram of an communication brokering method 600 for establishing and facilitating communication between applications on a client computer via a data broker on a remote server. As discussed above, the client computer may be the computing device 110, and the remote server may be the server 140. The applications on the client computer may be the desktop application 120 and the web browser 124, and the data broker may be the data broker 150.

The method 600 may begin by initiating operation of the data broker 150 on the server 140 (block 602). Operation may be initiated by the data application 152 upon start-up or in response to a triggering event, such as a user log-in or receipt of an initialization message from the computing device 110. The applications may also initiate operation of corresponding application elements, such as the add-in component 122 of the desktop application 120 and the web client 126 of the web browser 124. Initiation of such elements may include loading the application elements during application start-up or in response to another event, such as a user request. In some embodiments, some or all of the application elements may be initiated by communication from the data broker 150 to one or more of the desktop application 120 or web browser 124.

The data broker 150 may next establish communication connections between the remote server and the client computer (block 604). Establishing communication connections between the server 140 and the computing device 110 may include establishing communication connections between the data broker 150 and each of the add-in component 122 of the desktop application 120 and the web client 126 of the web browser 120 through the network 130. The communication connections may involve two-way real-time communication between the server 140 and the computing device 110 by pushing messages between the data broker 150 and each of the add-in component 126 and the web client 126, but not directly between the add-in component 126 and the web client 126. As discussed elsewhere herein, the add-in component 126 and the web client 126 communicate with each other only through the data broker 150.

The data broker 150 receives a first message from the computing device 110 via one of the communication connections (block 606). The first message may be received from either the add-in component 122 of the desktop application 120 and the web client 126 of the web browser 120. In some embodiments, the first message may include information relating to a document or portion thereof, such as an indication of a link or an indication of a comment input by a user of the computing device 110.

In response to receiving the receiving the first message, the data broker 150 may access a database 146 of the server 140 (block 608). The data broker 150 may access the database 146 directly or indirectly, such as through another routine of the data application 152. As discussed above, the database 146 may be accessed to retrieve, edit, or store data based upon the content of first message. For example, the data broker 150 may access the database 146 to create a new entry storing a user comment included in the first message, which may further be used to generate a link to the comment.

The data broker 150 may next generate a second message to send back to the computing device 110 (block 610). The second message may include the information in the first message, information relating to data stored in the database 146, or information derived from such information. For example, the second message may include an indication of a link to a comment stored in the database 146, which may further indicate a portion of the document associated with the comment.

The data broker 150 may next send the second message back to the computing device 110 (block 612). The data broker 150 may send the second message to an application element of another application than the application from which the first message was received. If the data broker 150 received the first message from the add-in component 122 of the desktop application 120, for example, the data broker 150 may send the second message to the web client 126 of the web browser 124. Alternatively, if the data broker 150 received the first message from the web client 126 of the web browser 124, the data broker 150 may send the second message to the add-in component 122 of the desktop application 120. In some embodiments, the data broker 150 may also send an acknowledgement or information back to the sending application in the second message. For example, the data broker 150 may send a second message containing information associated with an entry in the database 146 back to the web client 126 in response to receiving a first message from the web client 126. The method 600 may then terminate, or it may continue to facilitate further communication between applications of the client computer.

The systems and methods described herein may be used for various purposes to communicate data between two or more applications running on a computing device 110 through a network 130 using a data broker 150 running on a server 140. To further explain the use of such techniques, a specific exemplary use is described. The invention disclosed herein is not limited to such exemplary use, but the exemplary use is presented to further clarify operation of the systems and methods discussed herein. In the exemplary use, a number of users may perform an auditing review of documents using a software program (such as the data application 152) specifically designed to record notes and comments from the users in a database 146. The software program may operate on the server 140, allowing users to create, edit, review, and delete comments using web browsers 124. To access the documents to be reviewed, however, the users may use desktop applications 120, such as word processing software applications. Add-in components 122 may be installed in these desktop applications 120 to facilitate communication with the data application 152 via the data broker 150. When a user selects a portion of a document and clicks a command to add a comment, the add-in component 122 sends a message to the data broker 150 through the network 130. In response, the data broker 150 may push a message back through the network to the web client 126 of the web browser 124. This message may cause the web client 126 to present a comment entry window to the user in the web browser 124. The comment entry window may include a copy of the selected portion of the document in some embodiments. The user may then enter a comment in the web browser 124 and save the comment to the data application 152 by using the web client 126 to send another message including the comment to the data broker 150 through the network 130. When the data broker 150 receives the message from the web client 126, the data broker 150 may store the comment in the database 146 and send an indication of a link to the comment back to the add-in component 122 of the desktop application 120 through the network 130. Upon receipt of the message from the data broker 150, the add-in component 122 may cause an indication of the link to be added to the document by the desktop application 120.

Although the systems and methods are described herein as including the data broker 150 implemented on a server 140 distinct from the computing device 110, some situations may arise in which it may be advantageous to work temporarily "offline" on the computing device 110 without connection to the server 140 via the network 130. For example, a network connection may be unsecured or unreliable. In such situations, a client-side data broker may be implemented by an offline application running on the client device 110. In such embodiments, the client-side data broker may function as described above, mutatis mutandis, with the client-side data broker acting as the data broker 150 and the offline application acting as a local version of the data application 152. The communication between the data broker 150 and the add-in component 122 or the web client 126 may not require the use of the network 130 in such embodiments. Alternatively, the data broker 150 may communicate with the add-in component 122 and the web client 126 through the network 130, which may be a local network without access to the Internet. The offline application may include a stored portion of the data in the database 146, which may be synchronized with the database 146 periodically or episodically when a network connection between the computing device 110 and the server 140 is established via the network 130. Such synchronization may include downloading data from the database 146 and/or uploading data to the database 146 from the offline application. In some embodiments, the offline application may be a separately installed application on the computing device 110, which may be a server application. Offline embodiments may be used in conjunction with the online embodiments described above to enable an offline mode of use of the system 100 when a network connection through the network 130 is unavailable, unreliable, or otherwise disadvantageous to use.

Exemplary Computer System

Figure 7:
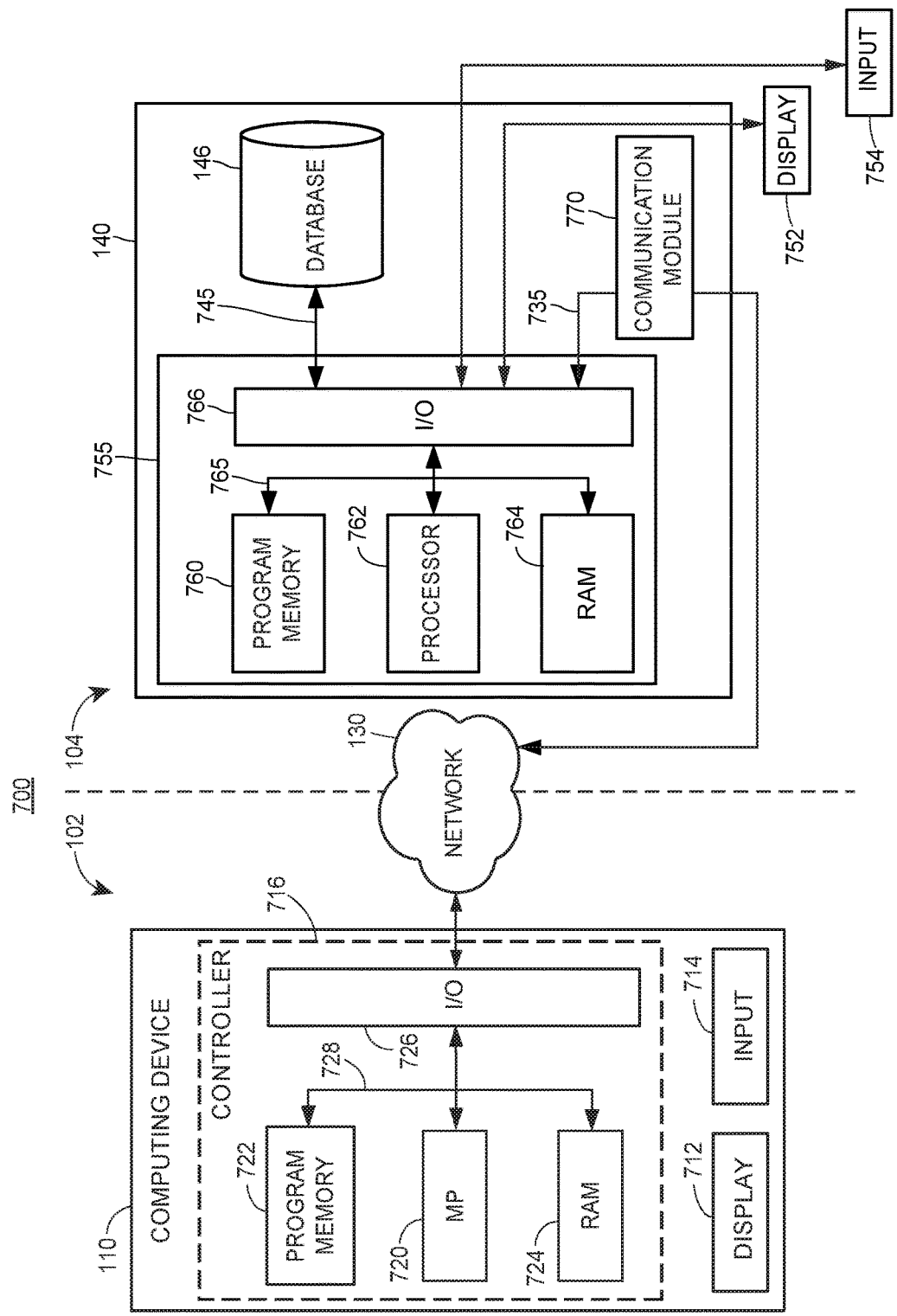
FIG. 7 illustrates a block diagram of an exemplary computing system for implementing the methods as described herein.

FIG. 7 illustrates a block diagram of an exemplary computing system 700 that may implement part or all of the communication methods and processes discussed herein. The system 100 may be configured to provide indirect communication functionality between the desktop application 120 and the web browser 124 through the data broker 150, as described above. The desktop applications 120 and web browsers 124 (including the add-in components 122 and web clients 126) may be implemented as computer-readable instructions stored on program memories of and executed by processors of computing devices 110, as discussed below. Similarly, the data brokers 150 (and data applications 152, if applicable) may be implemented as computer-readable instructions stored on program memories of and executed by processors of servers 140, as discussed below. Additional or alternative components may be included in various embodiments of the computing system 700.

The system 700 includes front-end components 102 and back-end components 104, communicatively connected through a network 130. The front-end components may be disposed within a computing device 110 operated by a user, and the back-end components 104 may be disposed within one or more servers 140. Each server 140 may further include or be communicatively connected to one or more databases 146. Although the example system 700 illustrates one computing device 110 and one server 140, it should be understood that the methods described herein may be implemented using any number of computing devices 110 or server 140. Additionally, in some embodiments, portions of the system may be implemented on separate servers 140 or computing devices 110. For example, the data broker 150 may be implemented on a first server 140, which communicates with the data application 152 implemented on a second server 140. As another example, the desktop application 120 may be implemented on a first computing device 110 (such as a desktop computer), and the web browser 124 may be implemented on a second computing device 110 (such as a mobile device, which may be a smartphone). In a preferred embodiment, however, the desktop application 120 and the web browser 124 are implemented on the same computing device 110, while communicating only through the data broker 150 implemented on the server 140.

The computing device 110 may be any type of computing device, including a desktop computer, a notebook computer, a netbook computer, a tablet computer, or a mobile device (such as a smartphone, a tablet device, or a wearable computing device). The computing device 110 may include a display 712, an input 714, and a controller 716. The input 714 may include an external hardware keyboard communicating via a wired or a wireless connection (e.g., a Bluetooth keyboard), an external mouse, a touchscreen display, a "soft" keyboard that is displayed on the display 712, or any other suitable user-input device. The controller 716 includes one or more microcontrollers or microprocessors (MP) 720, a program memory 722, a RAM 724, and an I/O circuit 726, all of which are interconnected via an address/data bus 728. The program memory 722 may include an operating system, a data storage, a plurality of software applications, and a plurality of software routines. The program memory 722 may include software applications, routines, or scripts for implementing part or all of the methods or software components described above, particularly the desktop application 120, add-in component 122, web browser 124, and web client 126. In some embodiments, the controller 716 may also include, or otherwise be communicatively connected to, other data storage mechanisms (e.g., one or more hard disk drives, optical storage drives, solid state storage devices, etc.) that reside within the computing device 110. It should be appreciated that although FIG. 7 depicts only one microprocessor 720, the controller 716 may include multiple microprocessors 720. Similarly, the memory of the controller 716 may include multiple program memories 722 or multiple RAMs 724. Although the FIG. 7 depicts the I/O circuit 726 as a single block, the I/O circuit 726 may include a number of different types of I/O circuits. The controller 716 may implement the program memories 722 or the RAMs 724 as semiconductor memories, magnetically readable memories, or optically readable memories, for example.

In some embodiments, the front-end components 102 may communicate with the back-end components 104 via the network 130 to facilitate communication between applications on the computing device 110. The network 130 may be a local area network (LAN), wide area network (WAN), a portion of a global network (e.g., the Internet), or some combination of networks. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140. Each server 140 may include one or more processors 762 adapted and configured to execute various software applications and components described above (particularly the data broker 150 and/or the data application 152), in addition to other software applications. As with the computing device 110, the server 140 may include or be communicatively connected to one or more displays 752 and inputs 754. The server 140 may further include a database 146, which may be adapted to store data related to the computing system 700, such as links or other information described above. The server 140 may have a controller 755 that is operatively connected to the database 146 via a link 745. It should be noted that, while not shown, additional databases may be linked to the controller 755 in a known manner. The server 140 may store or access data stored in the database 146 upon receiving a request from the computing device 110. In some embodiments, the server 140 may include a communication module 770 to send and receive communications between the sever 140 and computing devices 110 via the network 130. The communication module 770 may comprise software and/or hardware components configured to enable communication via the network using standard or specialized communication protocols.

The controller 755 may include a program memory 760, a processor 762, a RAM 764, and an I/O circuit 766, all of which may be interconnected via an address/data bus 765. As with the controller 716, it should be appreciated that although only one microprocessor 762 is shown, the controller 755 may include multiple microprocessors 762. Similarly, the memory of the controller 755 may include multiple RAMs 764 and multiple program memories 760. The program memory 760 may include software applications, routines, or scripts for implementing part or all of the methods or software components described above, particularly the data broker 150 and/or the data application 152, along with other software instructions or stored data. The various software applications stored in the program memory 760 may include a web server application responsible for generating data content to be included in web pages sent from the server 140 to the computing device 110. Although the I/O circuit 766 is shown as a single block, it should be appreciated that the I/O circuit 766 may include a number of different types of I/O circuits. The RAM 764 and program memories 760 may be implemented as semiconductor memories, magnetically readable memories, or optically readable memories, for example. The controller 755 may also be operatively connected to the network 130 via a link 735 through the communication module 770.

ADDITIONAL CONSIDERATIONS

Although the foregoing text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled," "communicatively coupled," or "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or (XOR). For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one, and the singular also includes the plural unless it is clear that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A computer system for facilitating electronic communication, comprising:
a server having one or more processors;
a communication module of the server configured to communicate data between the server and a client computing device via a communication network;
a program memory of the server storing executable instructions that, when executed by the one or more processors, cause the server to implement a data broker configured to:
receive, via the communication network, a first message including user-indicated data from an application add-in component of a first application executing on the client computing device via the communication module; and
send, via the communication network, a second message including information relating to the received data to a web client application implemented by a second application executing on the client computing device via the communication module in response to the received data, wherein the information relating to the received data includes at least a portion of the received data and wherein the message causes the web client application to display the information relating to the received data to a user of the client computing device,
wherein the application add-in component of the first application and the web client application of the second application are adapted to communicate with each other only by sending messages to and receiving messages from the data broker of the server via the communication network.

2. The computer system of claim 1, wherein the web client application is implemented by the web browser without a plug-in specific to the web client application.

3. The computer system of claim 1, wherein the data broker is further configured to:
receive a third message including user-input data entered by the user from the web client of the second application via the communication module; and
send a fourth message including information associated with the user-input data to the application add-in component of the first application.

4. The computer system of claim 3, wherein:
the user-indicated data is associated with a portion of a document accessed via the first application;
the user-input data includes a comment associated with the portion of the document; and
the fourth message includes information linking the portion of the document to the comment.

5. The computer system of claim 4, further comprising a database communicatively connected to the one or more processors of the server, wherein the data broker is further configured to store information regarding the comment in an entry in the database.

6. The computer system of claim 5, wherein the information linking the portion of the document to the comment includes a link to the entry in the database.

7. The computer system of claim 4, wherein:
the second message including information relating to the received data includes instructions to cause the web client to present a window to the user, which window is configured to accept the comment from the user; and the fourth message causes the add-in component of the first application to add an indication of the link to the document accessed via the first application.

8. The computer system of claim 1, wherein:

the data broker is configured to communicate with the second application using any of a plurality of the following real-time communication types: WebSocket, server-sent events, forever frame, or long polling; and the data broker is configured to communicate with the second application by selecting one of the plurality of real-time communication types.

9. A tangible, non-transitory computer-readable medium storing executable instructions for communication between a first application and a second application of a computer system, which executable instructions, when executed by one or more processors of the computer system, cause the computer system to:

receive, at an add-in component of the first application, an indication of a portion of a document accessed using the first application from a user of the first application;

generate, by the add-in component of the first application, a first message including information associated with the portion of the document;

transmit the first message to a data broker of a server from the add-in component of the first application of the computer system via a communication network;

receive a second message corresponding to the first message from the data broker of the server via the communication network at a web client of the second application of the computer system, wherein the second message includes at least a portion of the information included in the first message; and display information to the user by the web client of the second application based upon the second message, wherein the application add-in component of the first application and the web client application of the second application are adapted to communicate only by sending messages to and receiving messages from the data broker of the server via the communication network.

10. The tangible, non-transitory computer-readable medium of claim 9, wherein the web client application is implemented by the second application without a plug-in specific to the web client application.

11. The tangible, non-transitory computer-readable medium of claim 9, wherein the second application is a web browser and the first application is one of the following: a word processing application, a spreadsheet application, a presentation application, another document viewing application, or an image viewing application.

12. The tangible, non-transitory computer-readable medium of claim 9, wherein:

the indication of the portion of the document includes a selection within the first application of data in the portion of the document;

the first and second messages include representations of the selected data;

the information displayed to the user by the web client of the second application includes the representation of the selected data included in the second message.

13. The tangible, non-transitory computer-readable medium of claim 9, wherein the add-in component is installed as an addition to the first application utilizing an application programming interface (API) of the first application.

14. The tangible, non-transitory computer-readable medium of claim 9, further storing instructions that, when executed by the one or more processors of the computer system, cause the computer system to:

receive user-input data entered by the user at the web client application;

generate a third message including information associated with the user-input data by the web client application;

transmit the third message to the data broker of the server from the web client application;

receiving a fourth message corresponding to the third message from the data broker at the application add-in component of the first application.

15. The tangible, non-transitory computer-readable medium of claim 14, wherein the user-input data includes a comment associated with the portion of the document.

16. The tangible, non-transitory computer-readable medium of claim 14, wherein the fourth message includes a link to information regarding the comment.

17. The tangible, non-transitory computer-readable medium of claim 16, further storing instructions that, when executed by the one or more processors of the computer system, cause the computer system to:

add an indication of the link to the portion of the document by the add-in component of the first application in response to receipt of the fourth message.

18. A computer-implemented method for facilitating electronic communication, comprising:

establishing a first communication connection over a communication network between an add-on component of a first application executing on a client computer and a data broker executing on a server;

establishing a second communication connection over the communication network between the data broker executing on the server and a web client of a second application executing on the client computer;

sending to the data broker, from one of (i) the add-on component via the first communication connection or (ii) the web client via the second communication connection, a message including information relating to a user input indicating a comment regarding a portion of a document accessed via the first application;

receiving from the data broker, at the other one of (i) the web client via the second communication connection or (ii) the add-on component via the first communication connection, the message; and recording, by one or more processors, a link between the portion of the document and the comment;

wherein the application add-in component of the first application and the web client application of the second application communicate with each other only by sending messages to and receiving messages from the data broker of the server via the communication network.

19. The computer-implemented method of claim 18, wherein:

the second application is a web browser; and the web client application is implemented by the web browser without a plug-in specific to the web client application.

* * * * *